US009812254B2

(12) United States Patent
Wakabayashi

(10) Patent No.: US 9,812,254 B2
(45) Date of Patent: Nov. 7, 2017

(54) WIRELESS POWER FEEDER

(71) Applicant: Funai Electric Co., Ltd., Osaka (JP)

(72) Inventor: Naoyuki Wakabayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 664 days.

(21) Appl. No.: 14/242,108

(22) Filed: Apr. 1, 2014

(65) Prior Publication Data
US 2014/0300198 A1 Oct. 9, 2014

(30) Foreign Application Priority Data
Apr. 3, 2013 (JP) .................................. 2013-077916

(51) Int. Cl.
| H01F 27/42 | (2006.01) |
| H01F 37/00 | (2006.01) |
| H01F 38/00 | (2006.01) |
| H01F 38/14 | (2006.01) |
| H02J 7/02 | (2016.01) |
| H01F 27/00 | (2006.01) |

(52) U.S. Cl.
CPC ........... *H01F 38/14* (2013.01); *H01F 27/006* (2013.01); *H02J 7/025* (2013.01)

(58) Field of Classification Search
CPC ......... H01F 38/14; H01F 27/006; H02J 7/025
USPC .......................................................... 307/104
See application file for complete search history.

(56) References Cited

U.S. PATENT DOCUMENTS

| 5,557,206 A | 9/1996 | Won |
| 2008/0211614 A1 | 9/2008 | Mecke et al. |
| 2012/0074899 A1 | 3/2012 | Tsai et al. |

FOREIGN PATENT DOCUMENTS

| EP | 2428969 A2 | 3/2012 |
| JP | H04-305789 A | 10/1992 |
| JP | 2001/109852 A | 4/2001 |
| JP | 2001109852 | * 4/2001 |
| JP | 2008/288889 A | 11/2008 |
| JP | 2012/060850 A | 3/2012 |
| JP | 2012060850 | * 3/2012 |
| WO | 2012/124029 A1 | 9/2012 |
| WO | 2012/157454 A1 | 11/2012 |

OTHER PUBLICATIONS

Extended European Search Report issued in corresponding European Application No. 14162909.7 dated Mar. 31, 2016 (7 pages).
Office Action in corresponding Japanese Patent Application No. 2013-077916 dated Jan. 17, 2017, with translation (9 pages).

\* cited by examiner

*Primary Examiner* — Richard Tan
(74) *Attorney, Agent, or Firm* — Osha Liang LLP

(57) ABSTRACT

A non-contact communication coil for a non-contact power feeding device comprises a power transmission coil, a power receiving coil, and a resonance coil, and the non-contact communication coil includes a first receiver and a second receiver connected in series with the first receiver. The non-contact communication coil generates induction voltages in mutually opposing directions in the first receiver and the second receiver when current passes through at least one of the power transmission coil and the power receiving coil.

16 Claims, 5 Drawing Sheets

\* : Components to be controlled by controller 16

[FIG. 1]
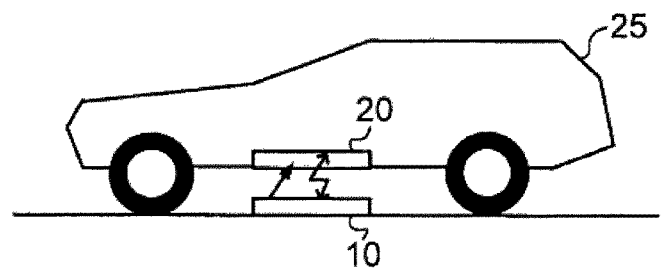
[FIG. 2]
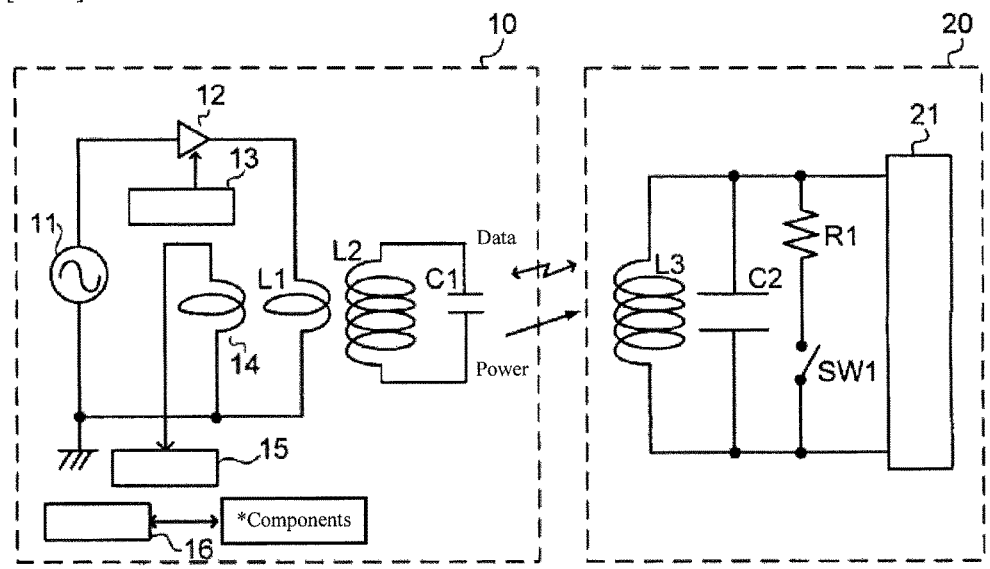
\* : Components to be controlled by controller 16

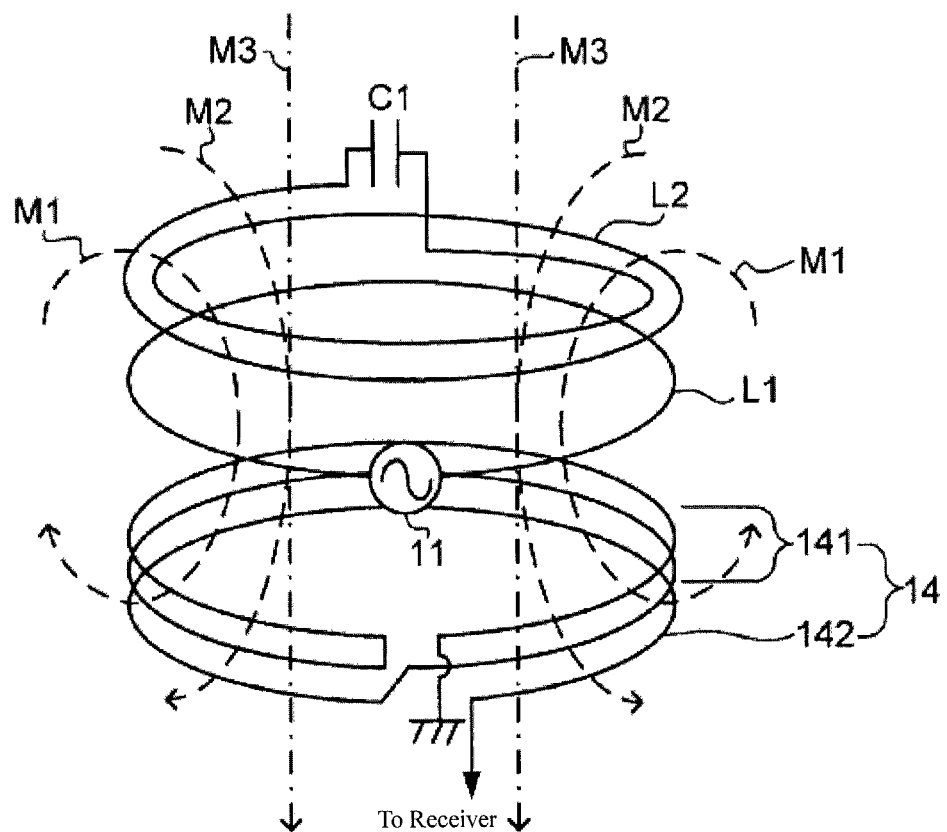
[FIG. 3]

[FIG. 4]
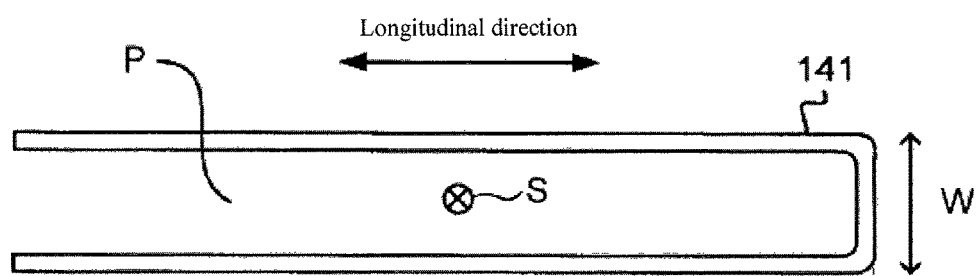
[FIG. 5]
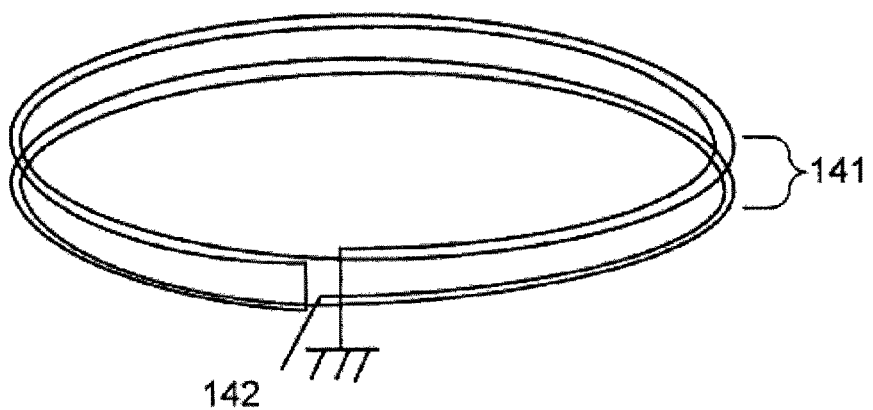

[FIG. 6]
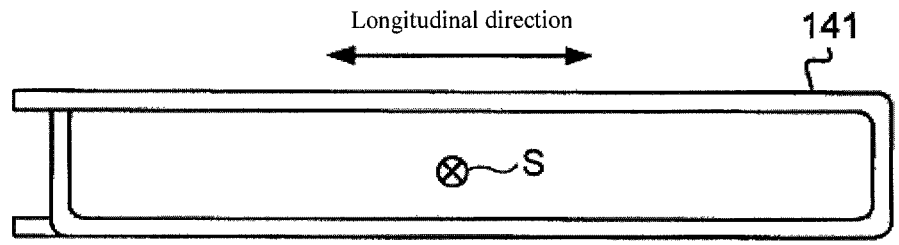
[FIG. 7]
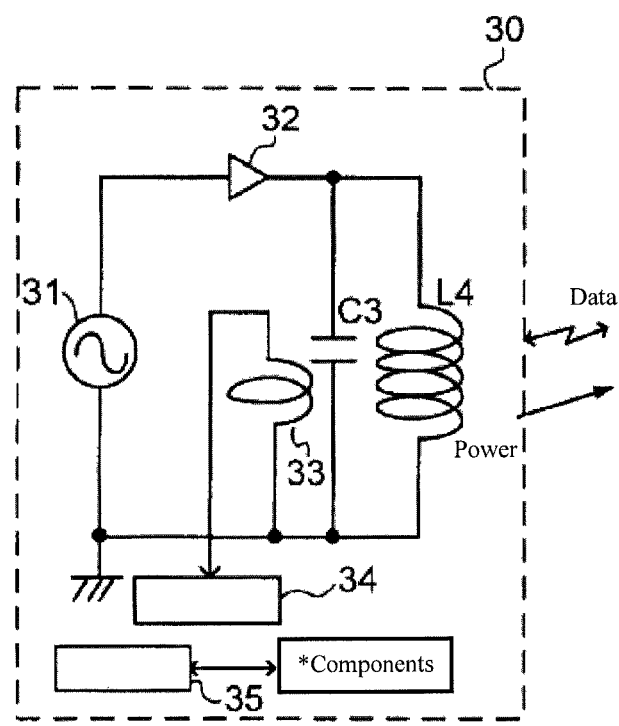
\* : Components to be controlled by controller 35

[FIG. 8]
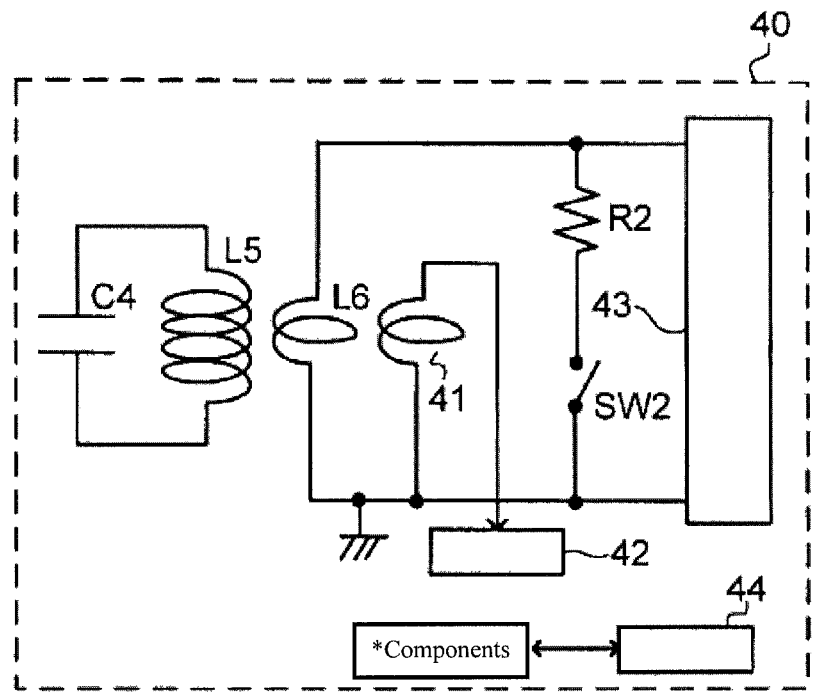
\* : Components to be controlled by controller 44

WIRELESS POWER FEEDER

TECHNICAL FIELD

The present invention relates to a non-contact communication coil.

BACKGROUND TECHNOLOGY

Conventionally, a device that feeds and receives power in a non-contact method and performs data communication is known.

For example, in Patent Document 1, a non-contact communication medium that is provided with a power receiving coil and a data receiving coil and that connects a cancellation coil substantially having the same inductance as a mutual inductance of the power receiving coil and the data receiving coil to connection points thereof.

A magnetic field emitted from the power receiving coil thereby cancels an electromotive force, which is noise generated in the data receiving coil, and improves reliability of data reception.

RELATED ART DOCUMENTS

Patent Documents

[Paten Document 1] Japanese Unexamined Patent Application Publication No. H4-305789

However, in a technique of Patent Document 1 described above, the data receiving coil does not have features in particular of its own, and a separate cancellation coil is needed.

SUMMARY OF THE INVENTION

One or more embodiments of the present invention provide a non-contact communication coil having a configuration that can improve performance of data communication.

According to one or more embodiments, a non-contact communication coil for a non-contact power feeding device comprising a power transmission coil, a power receiving coil, and a resonance coil may comprise: a first receiver; and a second receiver connected in series with the first receiver, wherein the non-contact communication coil generates induction voltages in mutually opposing directions in the first receiver and the second receiver when current passes through at least one of the power transmission coil and the power receiving coil.

According to such a configuration, for example, an induction voltage induced in the non-contact communication coil by the current that passes through the other coil can be suppressed. Therefore, for example, performance of data communication can be improved by suppressing effects from the other coil.

For example, in one or more embodiments, the first receiver may be configured by winding a coil extending in a longitudinal direction around an axis perpendicular to the longitudinal direction so the longitudinal direction becomes a circumferential direction, and the second receiver is a coil wound in the circumferential direction.

For example, in one or more embodiments, the power transmission coil, power receiving coil, and the resonance coil may be arranged nearer to the first receiver than to the second receiver.

Furthermore, in one or more embodiments, central axes of the first receiver and the second receiver may be coaxial. A communication area relative to an outermost shape size of the non-contact communication coil can thereby be widened.

Furthermore, in one or more embodiments, outer shape sizes of the first receiver and the second receiver may be identical. The communication area relative to the outermost shape size of the non-contact communication coil can thereby be widened.

Furthermore, a non-contact power feeding device according to one or more embodiments may comprise any of the above non-contact communication coils, wherein the power transmission coil is joined with the resonance coil.

According to such a configuration, for example, the induction voltage induced in the non-contact communication coil by the current that passes through the power transmission coil and the resonance coil can be suppressed, and data communication reliability can be improved by suppressing an effect from these coils.

Furthermore, a non-contact power feeding device according to one or more embodiments may comprise any of the above non-contact communication coils, wherein the power transmission coil is shared with the resonance coil.

According to such a configuration, the induction voltage induced in the non-contact communication coil by the current that passes through the power transmission coil shared with the resonance coil can be suppressed, and data communication reliability can be improved by suppressing an effect from the power transmission coil.

Furthermore, a non-contact power feeding device according to one or more embodiments may comprise any of the above non-contact communication coils, wherein the power receiving coil is joined with the resonance coil.

According to such a configuration, for example, an induction voltage induced in the non-contact communication coil by a current that passes through the power receiving coil and the resonance coil can be suppressed, and data communication reliability can be improved by suppressing an effect from these coils.

According to the non-contact communication coil of one or more embodiments of the present invention, the performance of data communication can be improved by suppressing the effect from the other coil.

BRIEF DESCRIPTION OF DRAWINGS

FIG. 1 is a schematic diagram of a charging system of an electric vehicle according to one or more embodiments of a first example of the present invention.

FIG. 2 is a block diagram of a power feeding/receiving device according to one or more embodiments of the first example of the present invention.

FIG. 3 is a diagram illustrating a configuration example of a communication coil according to one or more embodiments of the first example of the present invention.

FIG. 4 is a development view (plan view) illustrating an example of a proximal receiver according to one or more embodiments of the first example of the present invention.

FIG. 5 is a diagram illustrating another configuration example of the proximal receiver according to one or more embodiments of the first example of the present invention.

FIG. 6 is a development view (plan view) illustrating an example of the proximal receiver according to one or more embodiments of the first example of the present invention.

FIG. 7 is a block diagram of a power feeding device according to one or more embodiments of a second example of the present invention.

FIG. 8 is a block diagram of a power receiving device according to one or more embodiments of the third example of the present invention.

DETAILED DESCRIPTION OF EMBODIMENTS

First Example

Embodiments of the present invention will be described below with reference to drawings. An example where a power feeding device and a power receiving device according to one or more embodiments of a first example of the present invention are applied in charging an electric vehicle is illustrated in FIG. 1.

In the example illustrated in FIG. 1, at a charging stand or in a parking lot or the like, a power feeding device 10 is disposed on a ground surface of a location where an electric vehicle 25 parks, and a power receiving device 20 is disposed on a bottom surface of the electric vehicle 25. The power feeding device 10 emits a magnetic field in a state where the power receiving device 20 opposes the power feeding device 10 at or within a predetermined distance, and the power receiving device 20 receives the magnetic field and is fed with power. Moreover, communication occurs between the power feeding device 10 and the power receiving device 20 for notifying a start/end of power feeding, notifying a power feeding condition, exchanging information with each other, and the like.

A block diagram illustrating a specific configuration of the power feeding device 10 and the power receiving device 20 is illustrated in FIG. 2. As illustrated in FIG. 2, the power feeding device 10 is provide with an oscillator 11, a driver 12, a modulator 13, a communication coil 14, a receiver 15, a controller 16, a power transmission coil L1, a resonance coil L2, and a resonance condenser C1. Moreover, the power receiving device 20 is provided with a power receiving coil L3, a resonance condenser C2, a resistance R1, a change-over switch SW1, and a power receiving circuit 21.

The oscillator 11 generates a high-frequency signal having a frequency of a radiation magnetic field for power transmission. The driver 12 amplifies the high-frequency signal generated by the oscillator 11 by switching and passes a current with high frequency to the power transmission coil L1. The modulator 13 performs amplitude shift keying (ASK) modulation on the radiation magnetic field by controlling the driver 12 when sending data to the power receiving device 20.

The power transmission coil L1 emits a magnetic field for power transmission when a high-frequency current passes therethrough. The resonance coil L2 configures the resonance condenser C1 and a resonance circuit. The resonance coil L2 receives the magnetic field emitted by the power transmission coil L1 and emits a larger magnetic field for power transmission by passing a resonance current therethrough.

The communication coil 14 (non-contact communication coil) is a coil for receiving data from the power receiving device 20 and can receive data without being affected by the magnetic field emitted from the power transmission coil L1 and the resonance coil L2. A detailed configuration of the communication coil 14 will be described below.

The receiver 15 demodulates a signal received at the communication coil 14 for receiving data from the power receiving device 20.

The controller 16 controls various components of the power feeding device 10, such as the oscillator 11, the driver 12, the modulator 13, and the receiver 15.

Here, to describe power transmission from the power feeding device 10 to the power receiving device 20, passing the high-frequency current through the power transmission coil L1 in the power feeding device 10 passes the resonance current through the resonance coil L2, which is joined with the power transmission coil L1, and the magnetic field for power transmission is emitted. Then, on a power receiving device 20 side, this emitted magnetic field is received by the power receiving coil L3, and an induced electromotive force generated in the power receiving coil L3 is taken out as power. The power receiving circuit 21 charges the taken out power to, for example, a battery.

As illustrated in FIG. 2, the resonance condenser C2 may be provided in the power receiving device 20 to configure the power receiving coil L3 and the resonance circuit, but the resonance condenser C2 is not needed. Moreover, besides the power receiving coil, a resonance coil may be provided on the power receiving device 20 side, as in the power feeding device 10.

Furthermore, to describe data communication from the power feeding device 10 to the power receiving device 20, on a power feeding device side 10, a control by the modulator 13 modulates the magnetic field emitted from the resonance coil L2. Then, on the power receiving device 20 side, this emitted magnetic field is received by the power receiving coil L3, and the induced electromotive force is generated by the power receiving coil L3. The power receiving circuit 21 takes out data from this change in the generated induced electromotive force.

Furthermore, to describe data communication from the power receiving device 20 to the power feeding device 10, on the power receiving device 20 side, a load impedance of the power receiving coil L3 is changed by switching the change-over switch SW1 connected to the resistance R1 according to the transmission data and emitting the magnetic field from the power receiving coil L3. Then, on the power feeding device 10 side, this emitted magnetic field is received by the communication coil 14, and the transmitter 15 takes out data by detecting a change in inductive voltage generated by the communication coil 14.

Next, a configuration of the communication coil 14 will be described. As illustrated in FIG. 3, the resonance coil L2, the power transmission coil L1, and the communication coil 14 are provided near each other in the power feeding device 10 so as to be overlaid in a planar view. In FIG. 3, each coil is illustrated as a line segment for convenience, but each coil of course has thickness in reality.

The communication coil 14 is configured from a proximal receiver 141 disposed in a position close to the resonance coil L2 and the power transmission coil L1, and a distal receiver 142 disposed in a position far from the resonance coil L2 and the power transmission coil L1. The proximal receiver 141 and the distal receiver 142 are connected in series. One end of the proximal receiver 141 is connected to a ground, and one end of the distal receiver 142 is connected to the receiver 15 (FIG. 2).

As illustrated in a development view in FIG. 4, the proximal receiver 141 illustrated in FIG. 3 is a winding coil in a U shape with one end open extending in a longitudinal direction and wound once around an axis S orthogonal to the longitudinal direction so that the longitudinal direction becomes a circumferential direction. A magnetic flux (for example, a magnetic flux M1 in FIG. 3) arising from the current passing through the power transmission coil L1 and the resonance coil L2 interlinks with the proximal receiver 141. That is, the magnetic flux passes through a region P surrounded by the coil illustrated in FIG. 4.

The distal receiver 142 illustrated in FIG. 3 is configured from a coil wound once in the circumferential direction of the proximal receiver 141, has a central axis substantially coaxial to that of the proximal receiver 141, and has an outer diameter substantially the same as that of the proximal receiver 141. A magnetic flux (for example, a magnetic flux M2 in FIG. 3) arising from the current passing through the power transmission coil L1 and the resonance coil L2 interlinks with the distal receiver 142. Furthermore, a magnetic flux (for example, a magnetic flux M3 illustrated in FIG. 3) emitted for data transmission from the power receiving device 20 positioned more distally than the power transmission coil L1 and the resonance coil L2 interlinks with the distal receiver 142.

Here, defining the inductive voltage generated in the distal receiver 142 by interlinking the magnetic flux arising from the current passing through the power transmission coil L1 and the resonance coil L2 as e1, the inductive voltage generated in the proximal receiver 141 by interlinking the magnetic flux arising from the current passing through the power transmission coil L1 and the resonance coil L2 as e2, and the inductive voltage generated in the distal receiver 142 by interlinking the magnetic flux emitted from the power receiving device 20 as e3, an inductive voltage arising in the communication coil 14 is expressed by e1−e2+e3. That is, e1 and −e2 become inductive voltages of mutually opposite directions. The magnetic flux emitted from the power receiving device 20 does not interlink with the proximal receiver 141, and the inductive voltage therefore does not arise in the proximal receiver 141 due to the magnetic flux.

In the present example, e1=e2; that is, the inductive voltage arising in the distal receiver 142 by interlinking the magnetic flux arising from the current passing through the power transmission coil L1 and the resonance coil L2 and the inductive voltage arising in the proximal receiver 141 by interlinking the magnetic flux arising from the current passing through the power transmission coil L1 and the resonance coil L2 are designed to be equivalent. By this, the inductive voltage arising in the communication coil 14 becomes e3, and it becomes possible to take out only the inductive voltage due to the magnetic flux emitted as data from the power receiving device 20. Therefore, reliability of data reception can be increased without being affected by the radiation magnetic field from the power transmission coil L1 and the resonance coil L2.

As described above, to equate the values of the inductive voltages (e1=e2), it is sufficient to adjust a width (a width W in the example in FIG. 4) of the proximal receiver 141, a winding count of the proximal receiver 141 with the longitudinal direction as the circumferential direction, and a winding count of the distal receiver 142.

In the example illustrated in FIG. 3, the winding count of the proximal receiver 141 with the longitudinal direction as the circumferential direction is one time, but the winding count may be a plurality of times. For example, FIG. 5 illustrates the proximal receiver 141 where the winding coil wound in the U shape illustrated in FIG. 4 is wound twice with the longitudinal direction as the circumferential direction. The example in FIG. 5 has a structure that forms two layers in a radial direction.

Furthermore, in the example illustrated in FIG. 3, the winding count of the distal receiver 142 is one time but is not limited thereto and may be a plurality of times. Winding the plurality of times may improve data reception voltage.

Furthermore, in the example illustrated in FIG. 4, the wiring coil wound in the U shape is used as the proximal receiver 141, but as long as conditions of the inductive voltage described above are met, the proximal receiver 141, as illustrated in FIG. 6 for example, may be of a configuration that winds the winding coil, which is wound around the axis S so an outer shape becomes substantially rectangular, one or more times with the longitudinal direction as the circumferential direction.

Furthermore, in the example illustrated in FIG. 3, the proximal receiver 141 and the distal receiver 142 have substantially coaxial central axes, and the outer diameters are also substantially the same (i.e., outer shape sizes are substantially the same). While this condition is not needed, it can increase a size of the distal receiver 142 relative to an outermost shape size of the communication coil 14, that is, a communication area.

In one or more embodiments of the example described above, an example that uses the communication coil 14 for data reception is illustrated, but the communication coil 14 may be used for data transmission. It is thereby possible to perform high-speed data transmission without being affected by the current passing through the power transmission coil L1 and the resonance coil L2.

Furthermore, in one or more embodiments of the example described above, power transmission and data reception by the communication coil 14 are assumed to use the same frequency, but effectiveness is the same even when differing frequencies are used.

Second Example

FIG. 7 illustrates a configuration of a power feeding device according to one or more embodiments of a second example of the present invention. A power feeding device 30 illustrated in FIG. 7 is provided with an oscillator 31, a driver 32, a communication coil 33, a communication circuit 34, a controller 35, a resonance condenser C3, and a power transmission coil L4.

A difference between the present example and the first example (FIG. 2) is that the present example may share the power transmission coil L4 with a resonance coil and that the resonance condenser C3 and the power transmission coil L4 may configure a resonance circuit. A magnetic field may be emitted and power transmitted to a power receiving device (not illustrated) by a resonance current passing through the power transmission coil L4.

Furthermore, instead of performing modulation by the driver 32 to transmit data, data may be sent and received using the communication coil 33 and the communication circuit 34.

The communication coil 33 may be configured in the same manner as one or more embodiments of the first example, from a proximal receiver disposed in a position close to the power transmission coil L4 and a distal receiver disposed in a position far from the power transmission coil L4 and connected in series with the proximal receiver.

Values of each induction voltage of an opposite direction generated in the proximal receiver and the distal receiver by interlinking a magnetic flux arising from a current passing through the power transmission coil L4 are designed to be the same. Only the induction voltage generated in the distal receiver by interlinking the magnetic flux emitted as data from the power receiving device (not illustrated) can thereby by taken out. Therefore, reliability of data reception improves without being affected by the current passing through the power transmission coil L4.

Furthermore, when the communication coil 33 is used for data transmission, high-speed data transmission can be performed without being affected by the current passing through the power transmission coil L4.

Third Example

FIG. 8 illustrates a configuration of a power receiving device according to one or more embodiments of a third example of the present invention. The present example is an example of applying a communication coil to a power receiving device side instead of a power feeding device. A power receiving device 40 illustrated in FIG. 8 is provided with a communication coil 41, a receiver 42, a power receiving circuit 43, a controller 44, a resonance condenser C4, a resonance coil L5, a power receiving coil L6, a resistance R2, and a change-over switch SW2.

When a magnetic field for power transmission is emitted from the power feeding device (not illustrated), the resonance coil L5 receives this magnetic field, and a resonance current passes through a resonance circuit configured from the resonance condenser C4 and the resonance coil L5. An induced electromotive force is generated in the power receiving coil L6 joined with the resonance coil L5 by the resonance current, and the induced electromotive force is taken out as power.

Furthermore, a load impedance of the power receiving coil L6 is changed and data is transmitted by switching the change-over switch SW2 connected to the resistance R2 according to transmission data.

The communication coil 41 is configured from a proximal receiver disposed in a position close to the power receiving coil L6 and the resonance coil L5 and a distal receiver disposed in a position far from the power receiving coil L6 and the resonance coil L5 and connected in series with the proximal receiver.

Values of each induction voltage of an opposite direction generated in the proximal receiver and the distal receiver by interlinking a magnetic flux arising from a current passing through the power receiving coil L6 and the resonance coil L5 are designed to be the same. Only the induction voltage generated in the distal receiver by interlinking the magnetic flux emitted as data from the power feeding device (not illustrated) can thereby by taken out. Therefore, reliability of data reception improves without being affected by the current passing through the power receiving coil L6 and the resonance coil L5.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims.

EXPLANATION OF REFERENCE NUMERALS

10 Power feeding device
11 Oscillator
12 Driver
13 Modulator
14 Communication coil
141 Proximal receiver
142 Distal receiver
15 Receiver
16 Controller
L1 Power transmission coil
L2 Resonance coil
C1 Resonance condenser
20 Power receiving device
21 Power receiving circuit
L3 Power receiving coil
C2 Resonance condenser
R1 Resistance
SW1 Change-over switch
25 Electric vehicle
30 Power feeding device
31 Oscillator
32 Driver
33 Communication coil
34 Communication circuit
35 Controller
40 Power receiving device
41 Communication coil
42 Receiver
43 Power receiving circuit
44 Controller
C4 Resonance condenser
L5 Resonance coil
L6 Power receiving coil
R2 Resistance
SW2 Change-over switch

What is claimed is:

1. A wireless power feeder comprising:
   a power transmitter that transmits power to a power receiving device; and
   a communication unit comprising:
      a first receiver; and
      a second receiver connected in series with the first receiver,
   wherein induction voltages in mutually opposing directions are generated in the first receiver and the second receiver when current passes through the power transmitter,
   wherein the first receiver is configured by winding a coil extending in a longitudinal direction around an axis perpendicular to the longitudinal direction so the longitudinal direction becomes a circumferential direction, and the second receiver is a coil wound in the circumferential direction, and
   wherein outer shape sizes of the first receiver and the second receiver are identical.

2. The wireless power feeder according to claim 1, further comprising:
   a power receiver; and
   a resonance coil,
   wherein the power transmitter, the power receiver, and the resonance coil are arranged nearer to the first receiver than to the second receiver.

3. The wireless power feeder according to claim 2, wherein central axes of the first receiver and the second receiver are coaxial.

4. The wireless power feeder according to claim 1, further comprising:
   a resonance coil that receives a magnetic field emitted by the power transmitter.

5. The wireless power feeder according to claim 1, wherein
   when resonance current passes through the power transmitter, the power transmitter transmits power to the power receiving device by emitting a magnetic field.

6. The wireless power feeder according to claim 1, further comprising:
   a power receiver; and
   a resonance coil, wherein when resonance current passes through the resonance coil, induced electromotive force is generated in the power receiver.

7. A wireless power feeder comprising:
a power transmitter that transmits power to a power receiving device;
a communication unit comprising:
  a first receiver; and
  a second receiver connected in series with the first receiver,
a power receiver; and
a resonance coil,
wherein induction voltages in mutually opposing directions are generated in the first receiver and the second receiver when current passes through the power transmitter,
wherein the first receiver is configured by winding a coil extending in a longitudinal direction around an axis perpendicular to the longitudinal direction so the longitudinal direction becomes a circumferential direction, and the second receiver is a coil wound in the circumferential direction,
wherein the power transmitter, the power receiver, and the resonance coil are arranged nearer to the first receiver than to the second receiver, and
wherein outer shape sizes of the first receiver and the second receiver are identical.

8. A wireless power feeder comprising:
a power transmitter that transmits power to a power receiving device; and
a communication unit comprising:
  a first receiver; and
  a second receiver connected in series with the first receiver,
a power receiver; and
a resonance coil,
wherein induction voltages in mutually opposing directions are generated in the first receiver and the second receiver when current passes through the power transmitter,
wherein the first receiver is configured by winding a coil extending in a longitudinal direction around an axis perpendicular to the longitudinal direction so the longitudinal direction becomes a circumferential direction, and the second receiver is a coil wound in the circumferential direction,
wherein the power transmitter, the power receiver, and the resonance coil are arranged nearer to the first receiver than to the second receiver,
wherein central axes of the first receiver and the second receiver are coaxial, and
wherein outer shape sizes of the first receiver and the second receiver are identical.

9. The wireless power feeder according to claim 1, further comprising:
a resonance coil,
wherein the power transmitter is joined with the resonance coil.

10. The wireless power feeder according to claim 2, wherein the power transmitter is joined with the resonance coil.

11. The wireless power feeder according to claim 3, wherein the power transmitter is joined with the resonance coil.

12. The wireless power feeder according to claim 2, wherein when resonance current passes through the power transmitter, induced electromotive force is generated in the power receiver.

13. The wireless power feeder according to claim 3, wherein when resonance current passes through the power transmitter, induced electromotive force is generated in the power receiver.

14. The wireless power feeder according to claim 1, further comprising:
a power receiver,
wherein when resonance current passes through the power transmitter, induced electromotive force is generated in the power receiver.

15. The wireless power feeder according to claim 1, further comprising:
a resonance coil; and
a power receiver joined with the resonance coil.

16. The wireless power feeder according to claim 2, wherein the power receiver is joined with the resonance coil.

* * * * *